US008768939B2

(12) United States Patent
Aminian et al.

(10) Patent No.: US 8,768,939 B2
(45) Date of Patent: Jul. 1, 2014

(54) METHOD FOR CLASSIFYING INFORMATION ELEMENTS (75) Inventors: Mehdi Aminian, Lausanne (CH); Zeno Crivelli, Morges (CH); Thibaud Guillaume-Gentil, Neuchâtel (CH)

(73) Assignee: Jilion SA, Ecublens (CH)

( * ) Notice: Subject to any disclaimer, the term of this patent is extended or adjusted under 35 U.S.C. 154(b) by 54 days.

(21) Appl. No.: 12/968,772

(22) Filed: Dec. 15, 2010

(65) Prior Publication Data

US 2011/0099181 A1  Apr. 28, 2011

Related U.S. Application Data (63) Continuation of application No. PCT/EP2009/057492, filed on Jun. 16, 2009.

(30) Foreign Application Priority Data

Jun. 16, 2008 (EP) .................................. 08158362

(51) Int. Cl.
G06F 17/30 (2006.01)

(52) U.S. Cl.
USPC .................... 707/754; 707/760; 704/2; 704/9

(58) Field of Classification Search
USPC .................. 707/736, 754, 760–761; 704/2, 9
See application file for complete search history.

(56) References Cited

U.S. PATENT DOCUMENTS

| | | | |
|---|---|---|---|
| 6,154,720 A * | 11/2000 | Onishi et al. ........................ | 704/2 |
| 6,845,354 B1 * | 1/2005 | Kuo et al. ........................... | 704/9 |
| 6,851,112 B1 * | 2/2005 | Chapman ............................ | 718/1 |
| 7,640,254 B2 * | 12/2009 | McConnell .......................... | 1/1 |
| 2002/0013791 A1 * | 1/2002 | Niazi et al. ..................... | 707/516 |
| 2003/0041058 A1 * | 2/2003 | Ibuki et al. ......................... | 707/4 |
| 2005/0096950 A1 * | 5/2005 | Caplan et al. ....................... | 705/7 |
| 2006/0047623 A1 * | 3/2006 | Kimura et al. ..................... | 707/1 |
| 2006/0092487 A1 * | 5/2006 | Kuwabara et al. ............. | 358/537 |
| 2006/0112071 A1 | 5/2006 | Sako et al. | |
| 2007/0118509 A1 | 5/2007 | Svendsen | |
| 2007/0156696 A1 * | 7/2007 | Lim .................................. | 707/9 |
| 2008/0059347 A1 * | 3/2008 | Phillips et al. .................. | 705/34 |
| 2008/0071756 A1 | 3/2008 | Czerniak | |
| 2008/0125172 A1 * | 5/2008 | Leon et al. ..................... | 455/557 |
| 2008/0140688 A1 * | 6/2008 | Clayton et al. ............... | 707/100 |
| 2008/0162480 A1 * | 7/2008 | Clayton et al. ..................... | 707/8 |
| 2009/0299725 A1 * | 12/2009 | Grigsby et al. ................... | 704/2 |

OTHER PUBLICATIONS

Z. Xu, Y. Fu, J. Mao, and D. Su, Towards the Semantic Web: Collaborative Tag Suggestions, 2006, pp. 1-8, www.semanticmetadata.net/hosted/taggingsws-www2006-files/13.pdf.
S. Farrell, T. Lau, and S. Nusser, Building Communities with People-Tags, Proc. 11th International Federation for Information Processing TC 13 International Conference, Sep. 10-14, 2007, Rio de Janeiro, Brazil, pp. 357-360.

* cited by examiner

Primary Examiner — Hanh Thai
(74) Attorney, Agent, or Firm — Blank Rome LLP (57) ABSTRACT A method for displaying on a user's device display and selecting categorized information elements, comprising: grouping said information elements into one or several categories among one or several groups of categories, displaying said categories together with a list of information elements of said categories, making said information elements selectable, wherein the selection of one information element initiates a computer code to carry out a process with said information element, wherein said categories are based on a predefined dictionary thesaurus.

12 Claims, 6 Drawing Sheets

METHOD FOR CLASSIFYING INFORMATION ELEMENTS

BACKGROUND INFORMATION

This application is a continuation of PCT/EP2009/057492 (WO 2009/153270), filed on Jun. 16, 2009 and claims priority of EP patent application EP08158362.7, filed on Jun. 16, 2008, which are hereby incorporated in their entirety by reference.

FIELD OF THE INVENTION

The present invention concerns a method to display statistical information related to a kind of information elements, such as media items for instance, and to simultaneously offer filtering capabilities for filtering those information elements.

RELATED ART

Platforms and servers for downloading and managing information elements, such as media items, are well known. A popular example of platform and service includes the iTunes Store (registered trademark) service provided by Apple (another registered Trademark). Users can connect to a server over the Internet for downloading various information elements, such as songs, videos, games, etc, and often use a local application (such as, for example, Windows Media Player or iTunes) for connecting to the server and for managing the information elements which have been retrieved from the server or from other sources. An access from a browser or from various types of mobile equipment is also possible.

Information elements are often associated with tags and metadata for easier retrieval. Various types of tags may be used in order to classify and search media items according to various criteria. For example, a collection of music items may have tags corresponding to a genre of music, mood, geographic origin, and so on. Still pictures may have other tags defining the subject of the image, the dominant color, and so on.

Tags and metadata are often determined by the producer of the media item. Users may decide to edit, replace, delete or add tags. For example, one user may decide to reclassify a particular song in the category "rock" into the precise category "hard rock". This retagging is usually performed locally, in the user's application, and is only applied to the copy of the information element stored in the user's device; other users don't have access to the additional information or correction.

The search of information elements in the collection available from the remote server is often difficult, since the user has to reckon which classifications (tags) have been applied by the producers. A poorly classified information element is difficult to retrieve, even if many users have improved this classification and added tags to their local copy.

Another difficulty with many downloading platforms is the variability of the classification scheme used by different producers. One song may for example be classified as "rock and roll" while another very similar song may be tagged as "rockabilly". Tags are also often given in different languages, or misspelled. This makes the search and organization of information elements difficult and time consuming.

Another difficulty of many platforms is the difficulty to cope with multi-level or hierarchical classification schemes. In many services, the classification is not hierarchical; for example, the system does not know that "free jazz" is a sub-category of "jazz", and that "Germany" is in "Europe". A user who wants to retrieve music from Germany thus needs to search in the classification "Germany" first, and then in the broader classification "Europe".

Even when the classification is hierarchical, this hierarchy is usually fixed; users cannot edit this hierarchy, and cannot create new categories or sub-categories.

BRIEF SUMMARY OF THE INVENTION

There is therefore a need for a new computer-based method for classifying and retrieving information elements in a platform shared by different users.

In one aspect, the invention relates to a computer-based method of classifying information elements, such as media items, into categories, comprising the steps of:
displaying said information elements to a plurality of users over the Internet;
classifying said information elements in categories based on input from said users,
wherein a democratic process is used for deciding on the category or categories to apply when an information element is classified into different categories by different users.

The list of available categories, the hierarchical organisation of categories in sub-categories, and/or the names of the categories, may also be decided basing on a democratic process.

According to another aspect, one or several centrally stored thesaurus and/or dictionary is available for replacing automatically category names. It is thus possible to define the names of the categories in a plurality of languages, or to use synonyms or different spellings. Dictionaries may be used for example in order to translate names of categories in one single language; thesaurus for replacing category names by synonyms or equivalents.

The dictionaries and/or thesaurus may themselves also be edited by the users, for example based on a democratic process. For example, users could decide that "rockabilly" is a tag synonym to "rock and roll".

This dictionary and thesaurus can also be used for translating search query entered by users. This allows one user to enter a query in any language and retrieve information elements marked with a tag which is a translation or equivalent of the tag entered in the query.

The expression "democratic process" in this context relates to a technical process carried out by a computer and where a decision is based on input of a plurality of users, for example remote users accessing a system over the Internet. The decision may require a majority of the users, or a predefined number of votes, or be based on the best score or scores.

The information elements may correspond for example to media items. In this application the expression "media item" or "item" designates any digital file or data with artistic or informative contents, including for example music, videos, photos, texts, web pages, web sites, books, people, physical items and the like. In a preferred embodiment, media items are digital files or set of files that can be loaded over the Internet, streamed, and/or stored on a digital storage medium, for example music items, including for example .mp3 files, video files, web radios, and so on. The invention is especially well adapted to music where media items are songs.

The available groups of categories depend on the type of information elements. In the particular case of music, the information elements may for example be grouped in categories relating to a criterion such as genre of music (rock, classical, jazz, etc), while another group of categories may relate to the criterion language of lyrics, or to the criterion location or country of origin, etc.

The filtering may be made on any collection of information elements, for example on the user's personal collection, on a list of information elements in a web shop, on a query result, etc.

The information elements are selectable, and the list of information elements displayed in a particular view thus constitutes a user-selected list, for example a playlist in the case of music of video items. If the information elements correspond to music, the user may for example play each song in this playlist just by selecting it, for example with a single mouse click.

The categories are used for statistical purposes and offer a user with the possibility to view a representation of statistical occurrences of information elements in each category. This statistical indication displayed with the name of the category allows a user to immediately see if the category is active (if there are many information elements classified in this category), and to get a statistical evaluation of the content of a particular view or selection.

The categories are also used as menu options that a user can select in order to filter a list of information elements currently displayed. Users may select one or several categories or combination of categories.

All those combined functionalities offer the user with a new, fast, efficient, interactive, contextualized, cross-criteria information filtering method, with back and forth interactions between the group of information elements view and its related statistical filtering view.

According to an independent aspect of the invention, the selection as a filter of one or several categories in one particular group of categories will not only recompute and generate an updated list of information elements, but will also recompute and generate a new list of categories for all groups of categories describing the information elements. In addition, the statistics displaying the number of occurrences of information elements in each category of the updated list will also be recomputed.

In addition, such a selection will also recompute and generate a list of the most active entities, such as people (users) for instance, in the selected category or categories, or in all displayed categories. The most active entities could be for example the most used entities as source of recommendations by other users; or the most efficient entities in converting such recommendations into an action by other users. In this context, "action" can be for instance: reading, loading, playing, flagging, adding to a wish-list, purchasing, downloading, etc. an information item.

The categories may be presented on a user's device's display. The computation and the display may be performed by the same or by different devices.

BRIEF DESCRIPTION OF THE FIGURES

The invention will be better understood with the help of the enclosed Figures in which.

DETAILED DESCRIPTION OF PREFERRED EMBODIMENTS

Figure 1:
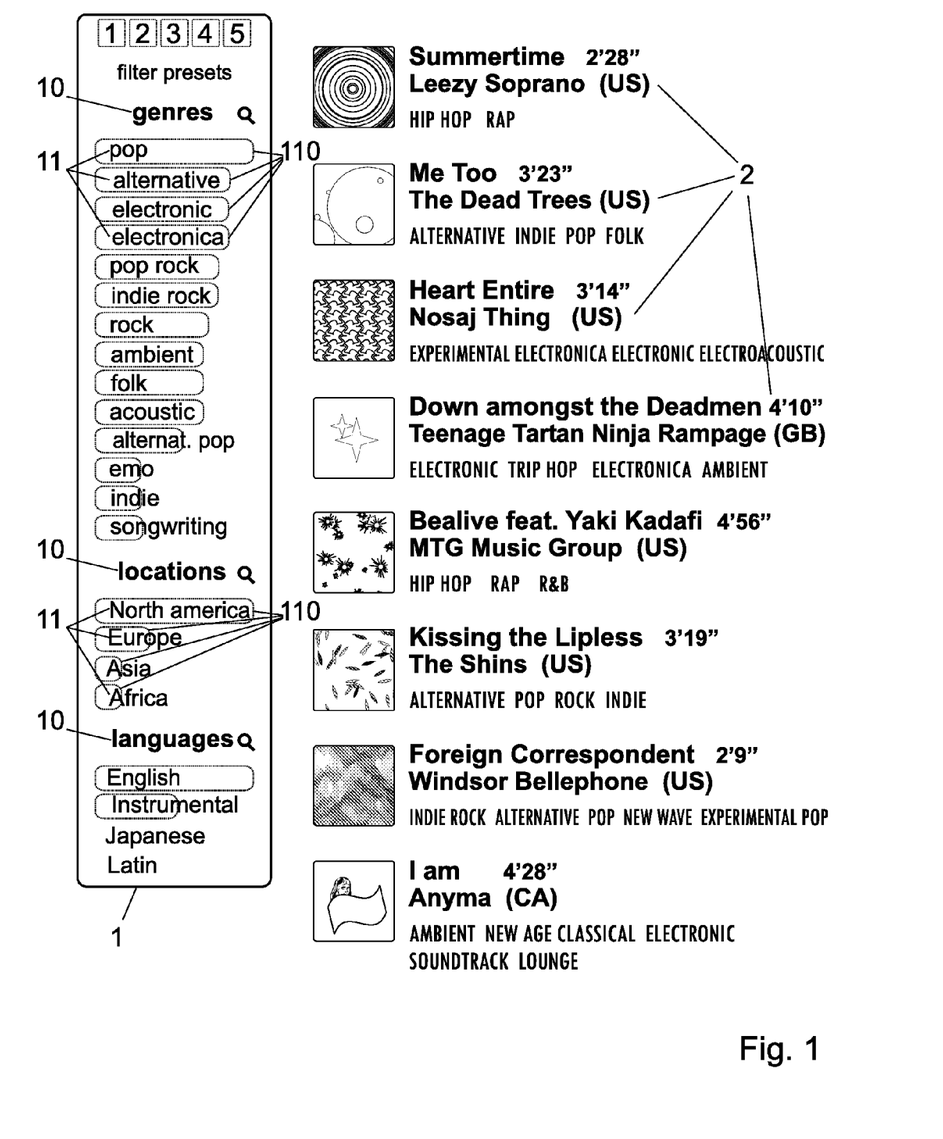
FIG. 1 schematically illustrates an example of screen copy with a category list and a list of information elements in the Main Information Group.
Figure 6:
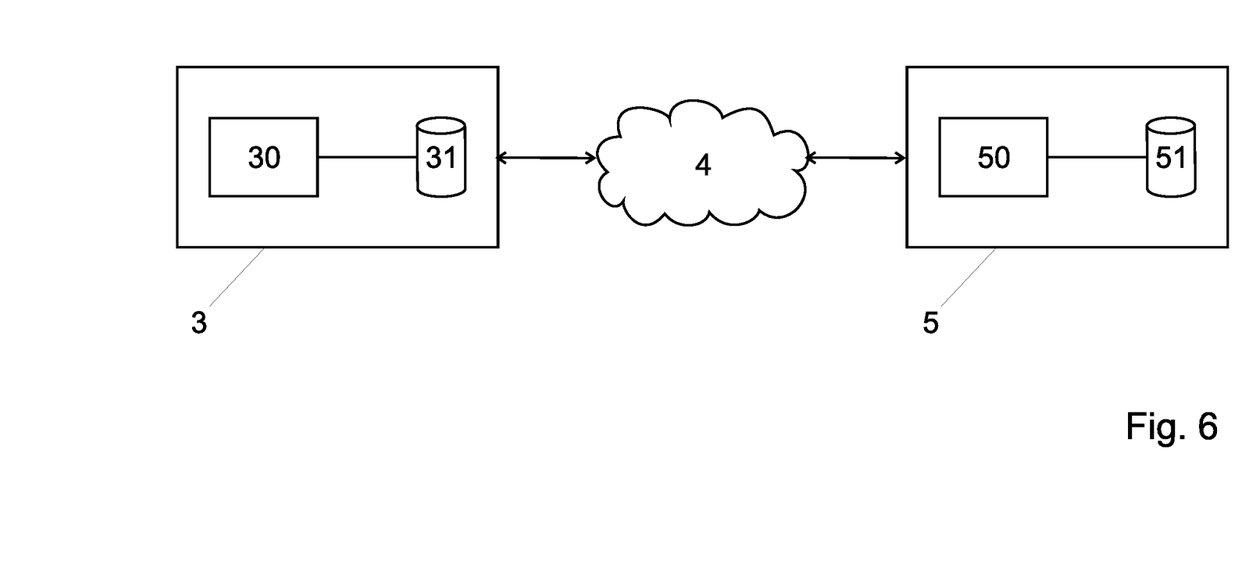
FIG. 6 schematically illustrates the system of the invention.

In one aspect, the invention relates to a method for generating a contextual graphical user interface view. This view is displayed on a user's device. The view illustrated on FIG. 1 presents a Main Info Group, i.e., a subset of all available information elements 2 filtered with one or several criteria, for example a play list of music songs. In this application, the Main Info Group designates the currently displayed list of information elements; it corresponds to a collection of information elements available locally (in the user's device 3, FIG. 6) or, alternatively, in a remote server 5 (for example a download platform accessible over the Internet 4).

Only the beginning (for example the first page) of a possibly longer list is displayed by the device and shown on the Figures; the user can see the rest of the list by scrolling or going to the next page.

The view also displays lists of categories 11 (i.e., statistical results) describing (categorizing) the information elements 2 in the currently displayed Main Info Group.

This general view preferably depends on one or a plurality of filtering criteria, each criterion defining a Contextual Statistical Single-criterion View 10 (CSSV). The CSSV is thus a view presenting the statistics and the information elements selected with one particular criterion.

The various filtering criteria 10 which may be used and combined to select the information elements that will be displayed in the Main Info Group include for instance, without any restriction, the genre, mood (sad, happy, etc), occupation types, geographic regions, language or other cultural attributes of the lyrics, or any tag or metadata associated to the information elements by the user, by other users (for example in a community), by the producer of the information element and/or automatically. Examples of tags/metadata that may be added automatically include for example, without any restriction, a date added into a database (for example the creation date, last playing date, etc), a number of times played, number of times purchased, number of times recommended, etc.

A list 1 (Stat List) of categories 11 is displayed and comprise an aggregation of all CSSVs. A category is only displayed if there is at least one occurrence of one information element belonging to this category in the Main Info Group. For example, on FIG. 1, the CSSV 10 "genre" includes the categories 11 "pop", "alternative", "electronic", etc.

Each element of the Stat list of categories (for example each line) corresponds to one category 11 (and thus to one statistical result).

Each category 11 is associated with a statistical indication 110 corresponding to the number of information elements in this category.

This statistical indication may be displayed for example, without any restriction, by a variable length or surface bar, and/or by the occurrence percentage and/or a computed score (for instance, the number of occurrences) and/or the position and/or ranking of each category within the Stat List of categories, etc. On FIG. 1, the category "pop" is associated with a longer bar 110 than the category "songwriting", for example, because there are more "pop" songs in the Main Info Group.

Each category 11 (each line of statistical results of the Stat List 1) can be selected by the user. The categories are thus also option of a menu. The selection of a particular category modifies the currently applied set of filtering criteria, and thus the list of information elements 2 displayed in the view, the list of categories in the Stat List, the statistical indication 110 associated with each category, etc.

The selection of a category 11 (for example with a click or keystroke on the graphical user interface) triggers the computation and display of a new Main Info Group. For example, the selection of a category 11 "alternative" on FIG. 1 triggers a new filtering of the information elements, and only the information elements marked with this specific tag are displayed on the right part of the display shown on FIG. 2.

This newly computed Main Info Group is in return triggering the computation and display of an updated list of categories 1 (Stat List) within the other CSSVs. For example, the selection of the categories "alternative", "United States" and "English" reduces the number of available genres to 7 on FIG. 2 instead of 14 initially on FIG. 1. The list of genres is not restricted to "alternative" on FIG. 2; this indicates that some of the information elements in the selected category "alternative" are also classified in one of the displayed categories "pop", "pop rock", "indie rock" etc.

Optionally, this updated list of categories 11 can include sub-categories of the selected category. For example, the selection of "United States" on FIG. 2 triggers the display of a new list of sub-categories corresponding to various States of the United States. This hierarchical list of sub-categories may be predefined, for example in a dictionary (such as an atlas), or defined by the user, or by all users of the system, or by all users within a community. In a preferred embodiment, the hierarchical organisation of categories is stored in a database 51 in a remote, central, shared server 5; a local copy may be available in a local database 31 in the user's device 3. The databases 51 also store the information elements (or links to those elements), tags associated with those elements, thesaurus and dictionaries for translating those tags, and other information.

Figure 2:
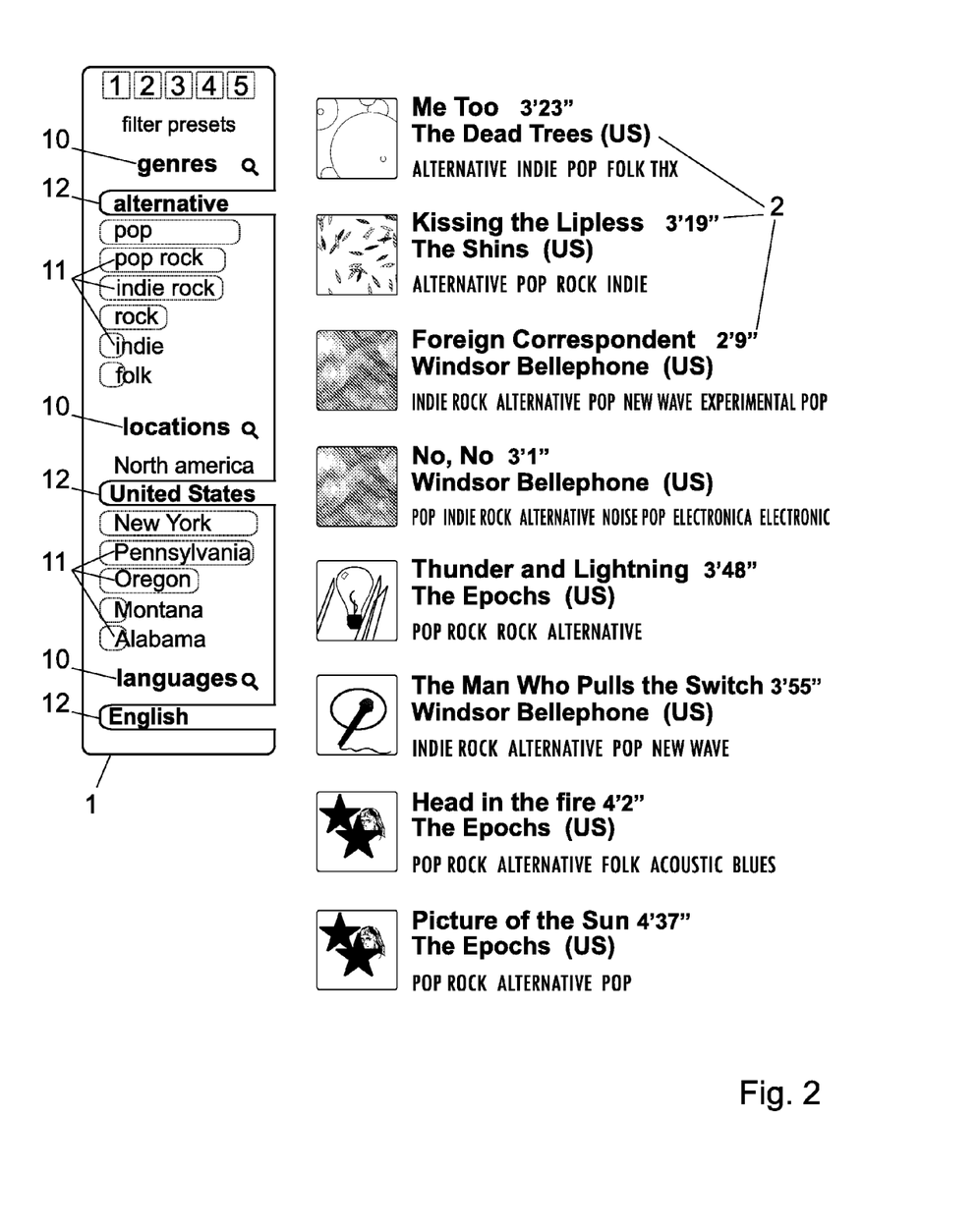
FIG. 2 schematically illustrates how the category list and the list of information elements is modified when some filters are engaged by clicking on some categories.

On the other side, the group of categories "genre" on FIG. 2 comprises only one hierarchical level in this example, so that the selection of one particular genre ("alternative") does not trigger a categorization into sub-categories of this genre.

In one embodiment, the categories 11 correspond to tags or metadata added by the users, or by some users, to the information elements 2. For example, one user may add a tag "pop" to a song.

A democratic process is used for determining the tags to apply when many different tags have been applied to the same information element 2 by different users. This democratic process is carried out by a classifying module 50 in the central server 5; in a preferred embodiment, the classifying module 50 comprises or uses a software program for collecting and evaluating tags and other inputs applied by various users, and for taking decisions relating to the classification of information elements.

For example, if 90% of the participating users classify a particular information element 2 as "pop", 30% as "rock" and only 2% as disco, the classifying module 50 within the central server 5 will decide to classify this information element first as "pop" and "rock"; the marginal classification "disco" will end up at the bottom of the list, or possibly be disregarded.

Tags retrieved from different users may have different weights, depending among other on the date at which this tag has been set. For example, an older classification of a song as "pop" may have less weight than a more recent classification of this item as "trip-hop". This allows a faster reclassification of information elements 2, for example when new genres or classifications are defined.

Different users may also have different weights depending on their level of activities. In this case, the weight of a tag added by a user who is often used as source of recommendations by other users is preferably more important than the weight of a tag put by a new or rarely recommended user.

The classifying module 50 thus preferably stores in its central database 51 in the platform 5 the date associated with each tag retrieved from users, as well as an identification of the participating user, or at least the weight of this user. This allows the module to weigh those different contributions depending on this date and user's activity.

A new classification for an information element is computed each time a tag has been added, deleted or edited by any user. Alternatively, or additionally, the classifying module can also compute a list of tags to apply periodically, for example every day, and/or when a sufficient number of changes have been received, and/or on request.

Similarly, the hierarchical organisation of categories stored in the central server may be decided, edited and modified by the users, using a similar democratic process. For example, a majority of users may decide that the genre "heavy metal" is a sub-category of the broader category "rock".

Different classification rules can apply to different groups of categories. For example, the sub-categories of a country, like "United States", may be predefined in the server 5 and/or in the local database 31, without any possibility for the community of users to edit this dependency.

The users can add or edit tags for example with their browser, or use a dedicated software application for managing collection of information items. Classifications added or modified by various users, or amendments to the hierarchy of classification, are centrally stored in the database 51, along with the date of the modification and/or with the identity or weight of the user who proposes this change. The central classifying module 50 recomputes the relevant classification, and the hierarchy of the classification system, each time a change is introduced. Local changes which are only stored in the local database 31 are also possible.

In one preferred embodiment, a widget is displayed that lists the tags that a user has previously introduced and that he can edit or delete. If a particular information element has not been tagged previously by the user, the widget displays a list of the most common tags added by other users for this element; the user can select one or several tags in this list, or add additional tags.

The selection as a filter of one category 11 in one particular group of categories will not only recompute and generate a new list of categories in this particular group, but also in all other groups. For example, the selection of the genre "alternative" will modify the number and the ranking of categories and sub-categories in the groups "locations" and "languages". In addition, the statistics 110 displaying the number of occurrences of information elements in each category 11 of the updated list will also be recomputed.

Such a selection preferably also recomputes and generates a list (not shown) of the most active users (or other entities) in the selected category or categories, or in all displayed categories. The most active users could be for example the users most often used as source of recommendations by other users, or the users who are most efficient entities in converting their recommendations into an action by other users. In this context, "action" can be for instance: reading, loading, playing, flagging, adding to a wish-list, purchasing, downloading, etc. an information item. This list of active users is displayed at each moment to the particular user.

The updated Stat List of categories 1 (Stat List) displays the currently selected categories 12 (with the corresponding statistical result 110) at the beginning (either top or bottom) of the list. In a preferred embodiment, the selected category is visually clearly identified as "selected" or "engaged". On FIG. 2, the selected categories 12 "alternative", "United States" and "English" (in three different groups of categories) are identified with a fat font. It is also possible to select different categories 12 in a single group of categories (for example all information elements originating from United States or Germany).

The selected category 12 (with the corresponding statistical indication) is in fact a user-activated filtering criterion for the related Main Info Group, where therefore every and all elements (100%) of the updated Main Info Group belong to this selected category. On FIG. 2, all information elements 2 displayed on the right part belong to the three currently selected categories "alternative", "United States" and "English".

The categories 11 (statistical results) are sorted in the Stat List 1 by the frequency of their occurrences, (i.e., by the number of related information elements in the displayed Main Info Group), either in descending or ascending order.

Figure 3:
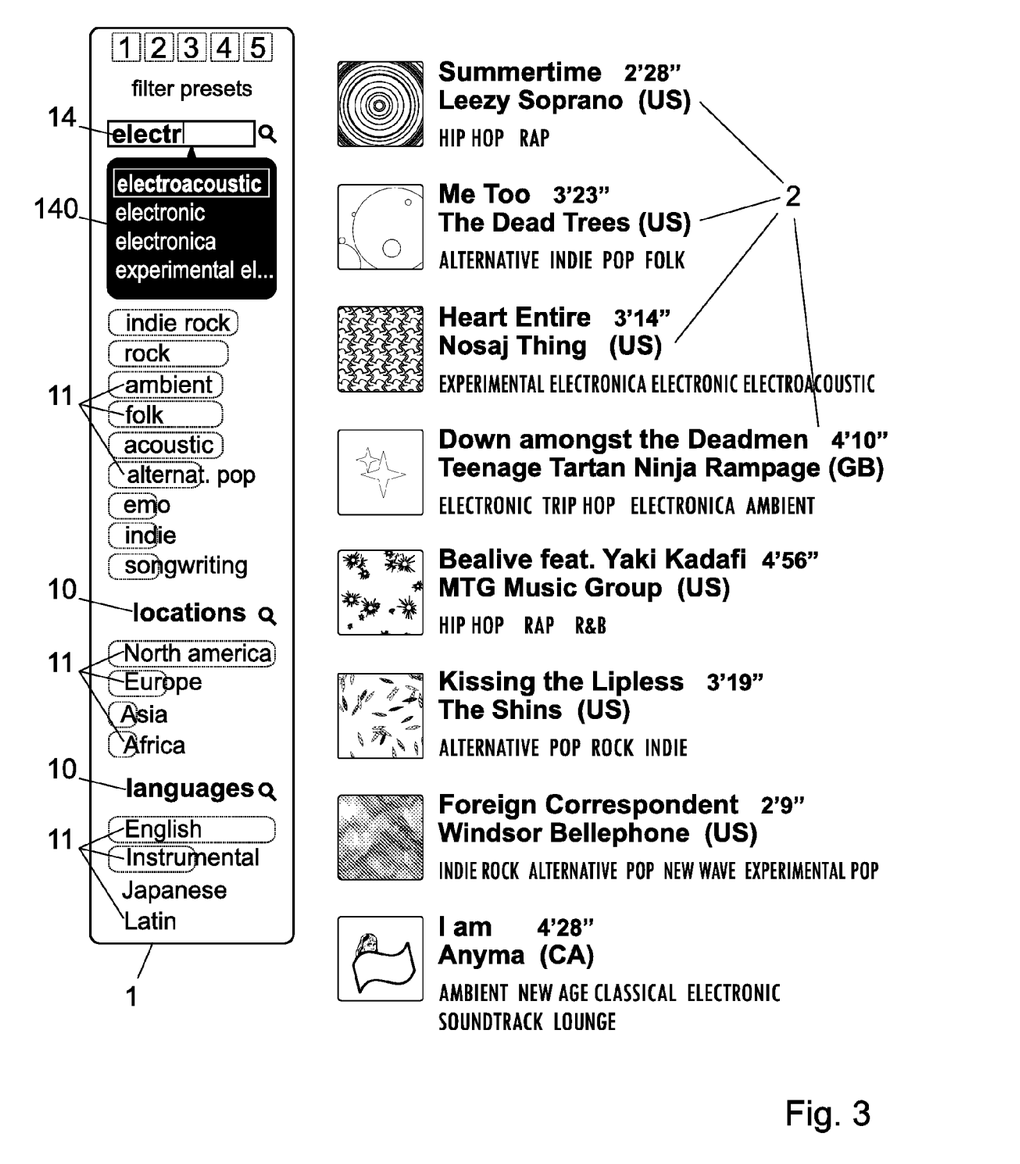
FIG. 3 schematically illustrates how to .search a category among all the categories in the category group "Genre".
Figure 4:
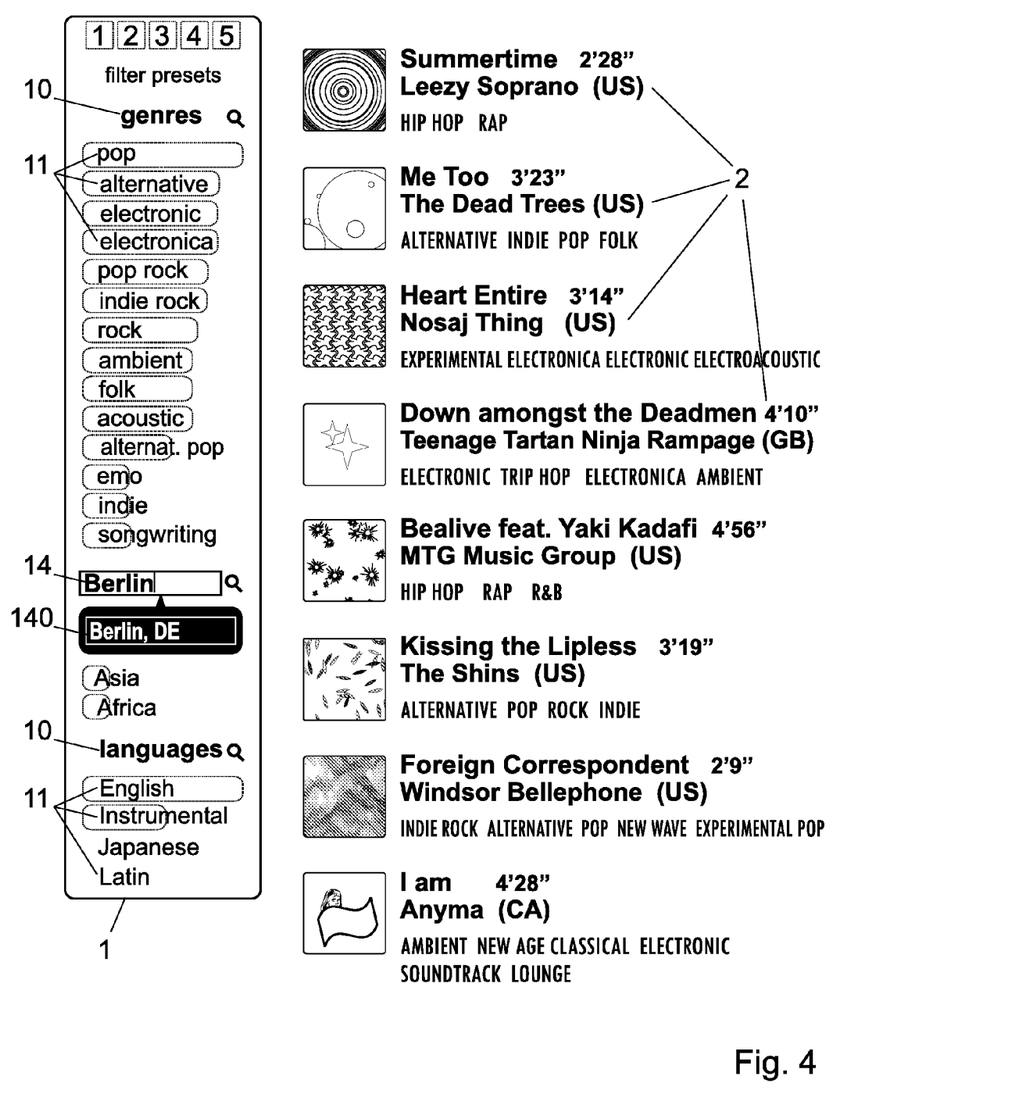
FIG. 4 schematically illustrates how to .search a category in the category group "Locations".
Figure 5:
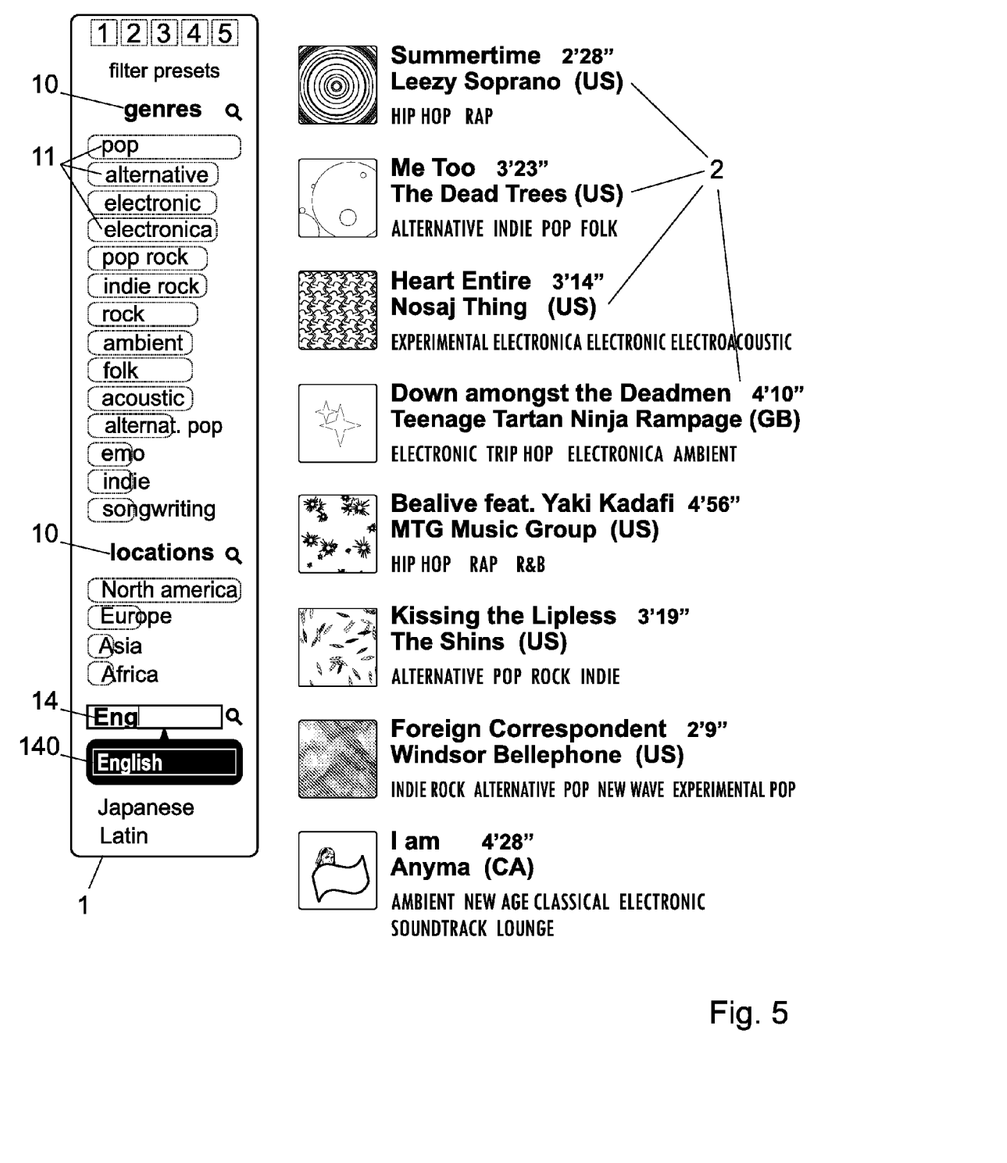
FIG. 5 schematically illustrates how to search a category in the category group "Language".

Categories 11 can be searched by the user within each CSSV. This search can be performed by the user for example by clicking on a symbol next to each group title and typing any arbitrary chain of characters 14 (search query) potentially matching one or several existing Main Info Group's element's descriptions, as illustrated on FIG. 3.

In the event there is one of several matches to such search query 14, such matches are presented to the user in a user-selectable results list 140. On FIG. 3, typing the chain "electr" in the search mask for the group of category "Genre" triggers the display of a menu 140 with the corresponding categories "electroacoustic", "electronic", "electronica" and "experimental electronic". In a multilanguage system, this list may be based on a translation of the user's input, using a translation dictionary and/or a thesaurus for translating the user's query.

Each line of such results list 140 indicates there is at least one statistical occurrence of itself in the Main Info Groups elements' descriptions. For example, the existing category "electric" is not displayed in the menu of FIG. 3, because there are no information elements classified in this category in the current Main Info Group. The menu is thus context dependant, and depends on the current Main Info Group.

The number of information elements in each category of this menu 140 is preferably visually represented, for example with a bar length or any indications as above described (not shown).

Alternatively, all known categories corresponding to a search query are listed in the menu, even if those categories have no occurrence.

The selection by the user of one category in such a menu 140 is engaging it as a user-activated filter 12, and modifies the currently applied filtering criterion, the Main Info Group, the list of categories of all and any CSSV, etc.

The list of possible categories 11 in a group of categories may be predefined. For example, the list of possible locations or languages may be predefined within the system, and centrally stored. As indicated, this centrally stored list of categories in each group, and the hierarchy of categories, can also be updated or modified by the users, using a democratic process.

Categories correspond for example to tags associated to the information elements by the user, and/or by all users, and/or by the producer, and/or automatically. For example, the classification of songs into different "genres" can be made initially by the producer, and changed, updated or redefined by the community of users. If the community of users don't agree on a classification of a particular information element, the classifying module 50 in the central server 5 may use, as part of the democratic process, a statistical evaluation of the classifications, and apply for example only the most often selected classification, or the classifications which have been chosen by a sufficient number of users, and/or classifications applied by "super-users" trusted by the operator of the system or by the community. This user classification typically also evolves over the time and recently applied classifications may have more weight than older classifications or tags. Moreover, software that automatically classify information items—for example based on other tags (such as name of artists), on information retrieved from other databases, on audio or video content analysis, etc may also be used, either for replacing the users' classification, or in combination.

Different users often use different names for similar categories, use different languages, misspell names, etc. In one aspect, the method uses semantic methods and algorithms in order to unify the names used for categories. For example, the method preferably uses locally and/or centrally stored translation dictionaries, and other translation tools, for replacing category names in one language (for example "musique classique") by a name (such as "classical") in a different language, such as English (by default) or the user's language. Thesaurus and lists of synonyms, metonyms, hypernyms, hyponyms, holonyms and/or meronyms, as well as other semantic tools, can be used for grouping similar categories ("electronic", "Electronic" and "electronics" for example) or joining similar categories ("brazil" and "japan" into "world music" for example). Moreover, spelling and typing mistakes may be corrected using spell correcting tools.

Those different dictionaries and thesaurus may be predefined, and/or manually edited by the users, or automatically updated based on user's selection. Again, the edition or modification of a dictionary or thesaurus advantageously uses a democratic process; a change will only be introduced in a dictionary or thesaurus if a majority and a sufficient number of participants have agreed on this change. For example, some users may consider that "dance music" is a synonym of "electronica", while other will consider that those are two distinct categories.

In one embodiment, users have the possibility to introduce in the server 5 and to publish change requests for editing the tags associated to each information element, and/or the classification hierarchy, and/or the thesaurus or dictionaries. A change request will only be validated if this change request has been accepted by a sufficient number of users, and/or by a majority of users who participate within a given time frame. In one embodiment, a change request will be sent or made available to all users having downloaded or otherwise used an information element concerned by this change; those users are invited to accept or reject this change within a given time frame. All replies will then be collected by the classifying module 50 in the central server 5, and evaluated with a democratic process in order to take a decision.

In another embodiment, changes are introduced immediately, for example each time a user edits a tag on its local copy 31 of the information element and synchronises this change with the central collection 51. Mechanisms are available in order to prevent objectionable changes in the shared dictionaries and thesaurus, for example erroneous translations, unsound synonyms, or bad renaming of categories made by incompetent or malicious users. For example, the change is only accepted if a predefined number or percentage of users have made the same request.

After acceptation, editions in the thesaurus and/or in the classification scheme are automatically and immediately applied to all information elements, including previously introduced elements.

Statistical computations can also be used to decide on the best accepted spelling or for automatically detecting synonyms (for example when different tags such as "rockabilly", "rock and roll" and "rock'n roll" to classify the same information elements). For example, users may decide to replace the spelling "rock and roll" by "rock'n roll"; this edition will be introduced after a democratic process, and automatically applied to all information elements in the central server which are marked with this tag.

In one embodiment, only "super-users" are allowed to edit the dictionaries or thesaurus. A super-user may for example be designated as such by the administrator of the system, or by other users, or automatically get this right after a certain number of actions or recommendations from other users. Alternatively, or in addition, changes in the thesaurus or dictionaries are only accepted when requested by a sufficient number of users, or a sufficient percentage of users; a democratic process where users vote for the best name for a category, or the best translation of this name, may also be used, alternatively or in addition.

As previously indicated, this democratic process can also be used for tagging or categorizing each particular information element; for example, a first number of users may classify a particular information element as "pop music" whereas other users will find this is "Pop" or "hip hop". In this case, the system may for example use a thesaurus to find that the tags "pop music" and "Pop" correspond to a same category, choose the best or most widespread name to use for this category (possibly in different languages), and decide on the best classification or classifications to apply depending on the number of recommendations (the score) in each category.

In one embodiment, the automatically and/or user-edited thesaurus and dictionaries are also used for translating search queries 14 entered by the users. For example, a query expressed in French with the criterion "Suisse" will also automatically retrieve categories, respectively information elements, corresponding to "Switzerland". A user searching for "Rock-a-Billy" will retrieve "rock and roll" information elements if the system and/or the users decide that both names are synonyms. A user having selected a Japanese interface can enter a search query in English if this is more convenient for him, and retrieve results in Japanese, whereas the translation of the search query and/or of the results is based on the thesaurus and dictionaries, for example but not restricted to user-edited thesaurus and dictionaries.

In one aspect, the invention also relates to the representation of a collection of any number of desired CSSVs, where each of such CSSV displays categories (statistical results) and offer simultaneous filtering capabilities for one particular criterion related to the Main Info Group's elements.

All CSSVs' statistical results of such collection are recomputed and updated when the Main Info Group elements are changed, for instance in the event of one CSSV's category being selected by the user and therefore acting as a filter.

Each CSSVs' of such collection can be independent of each other having one or no user-activated filter engaged.

Therefore, in the event none of the CSSVs of such collection has a user-activated filter engaged, such collection of CSSVs is then acting purely as a statistical display for the Main Info Group's elements.

On the other side, in the event one or several CSSVs of such collection have one or several user-activated filter(s) engaged, such collection of CSSVs, in addition to act as statistical display for the Main Info Group's elements, is also acting as a single or multiple filtering criteria filtering control interface for the user on the Main Info Group's elements.

A configuration of one or several engaged user-activated filters 12 can be saved as one filter preset tabs by the user for future quick retrieval of such filter configuration. In a preferred embodiment, this saving is performed for example by a long click, or by a double click, on one of the filter tabs on the left side of each figure. A long click means here an action in which the user clicks on a button (for example on his mouse), and waits more than a predetermined time T before to release the button. Other widgets, including pop-up menus, maybe used instead of tabs.

There can be several of such presets provided to the user. The figures illustrate an example with 5 filters designated by the numbers 1 to 5 and selected with five tabs on the upper-left corner of the figures. Other names may be associated with the filters.

The presets are personal to each user (or group of users) and stored as part of their individual profiles or preferences, in order to be available through different sessions. The selection of a preset may be made by a fast click on a corresponding tab.

The selection at any time by the user of one or several categories identical to those stored previously in a preset will render such preset as active/selected to give the user a visual feedback and inform him that he already had a preset saved with the same categories.

Changes in the tags applied to information elements, in the classification scheme and/or in dictionaries and thesaurus which are performed by the classifying module 50 in the central plateform 5 can be copied or synchronised with local copies of the same information in local database 31. This transfer is preferably performed automatically each time the user's device 3 is connected to the central platform and/or on request.

The present invention also relates to apparatus 3, such as but not limited to computers, servers, PDAs, cellphones, personal music players, etc, used in the method, and to computer data support having code portions that can be executed by those apparatus in order to carry out the method.

The invention claimed is:

1. A computer based method of classifying information elements, such as media items, into categories, comprising steps where:
   displaying information elements on a display to a plurality of users;
   users apply tags to said information elements by a computer, said tags being useful to a classifying module for classifying said information elements;
   transmitting said tags applied by different users to a central platform over a telecommunication network;
   classifying, by a classifying module in said central platform, said information elements based on said tags retrieved from the users, using a democratic process for deciding on the category or categories to associate with each information element when different tags have been applied to a same information element by different users, wherein the democratic process provides a decision based on input from the plurality of users; and
   translating, replacing or modifying names of categories, at said central platform, based on a centrally stored dictionary thesaurus.

2. The method of claim 1, wherein said classifying module automatically changes the tag associated with an information element when a majority of the participating users, or a predefined number of users, have applied a corresponding tag.

3. The method of claim 1, wherein one or several said information elements are filtered from a main information group according to one or several filtering criteria:

wherein the number of information elements in the displayed categories is visually represented;

and wherein said categories are made user-selectable, wherein the selection of a category modifies said filtering criteria.

4. The method of claim 1, comprising a step of searching one category;

wherein said step of searching comprises a user entering a category search query, and the system proposing a list of existing categories corresponding to said query;

and wherein said list of existing categories corresponding to a query is determined with a dictionary and/or thesaurus.

5. The method of claim 4, wherein said thesaurus or dictionary is managed by users of the system.

6. The method of claim 5, wherein the democratic process is used for managing said thesaurus or dictionary.

7. The method of claim 1, comprising a step where a user enters a category search query, and the system translates this search query using a dictionary and/or thesaurus.

8. The method of claim 1, wherein names of available categories is defined in a plurality of languages, wherein a dictionary and/or thesaurus is defined for retrieving different names corresponding to a single category, wherein said dictionary and/or thesaurus is edited by said users.

9. The method of claim 1, in which the user stores a selection of filtering criteria by doing a long click on one element or a graphic user interface.

10. The method of claim 1, further comprising an automatic selection and display of other recommended users, wherein said selection depends on said filtering criteria and on action of said recommended users, wherein said users are selectable for retrieving additional recommendations for information elements.

11. A computer data support having code portions that can be executed by an apparatus in order to: display information elements on a display to a plurality of users; enable users to apply tags to said information elements, said tags being useful to a classifying module for classifying said information elements; transmit said tags to a central platform over a telecommunication network; classify said information elements based on said tags retrieved from the users using a classifying module in said central platform, wherein said classifying module uses a democratic process for deciding on the category or categories to associate with each information element when different tags have been applied to a same information element by different users, wherein the democratic process provides a decision based on input from the plurality of users; translate, replace or modify names of categories, based on a centrally stored dictionary or thesaurus.

12. A computer based method, which can be carried out at a central platform, for classifying information elements, such as media items, into categories, the method comprising the steps of:

receiving, at a central platform, tags which have been applied to information elements by a plurality of users;

classifying said information elements by a classifying module at the central platform based on said tags, by the classifying module using a democratic process for deciding on the category or categories to associate with each information element when different tags have been applied to a same information element by different users, wherein the democratic process provides a decision based on input from the plurality of users; and translating, replacing or modifying names of categories, at said central platform, based on a centrally stored dictionary thesaurus.

* * * * *